Aug. 24, 1965     R. VILLALOBOS     3,201,971
GAS CHROMATOGRAPH
Filed Oct. 8, 1962     2 Sheets-Sheet 1
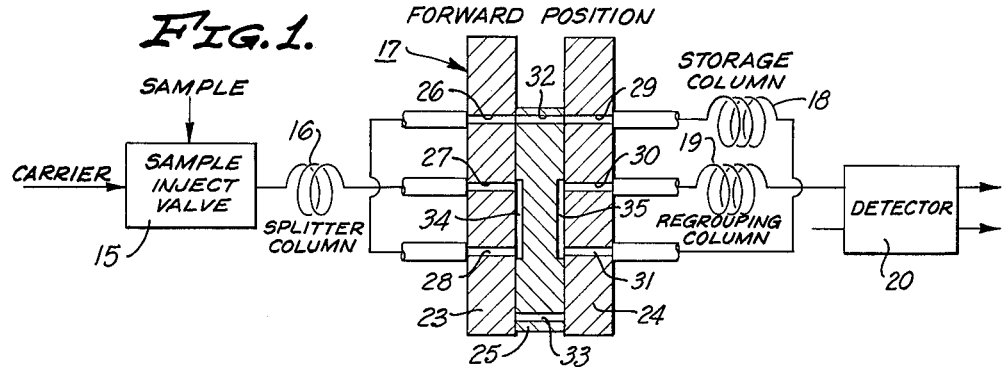
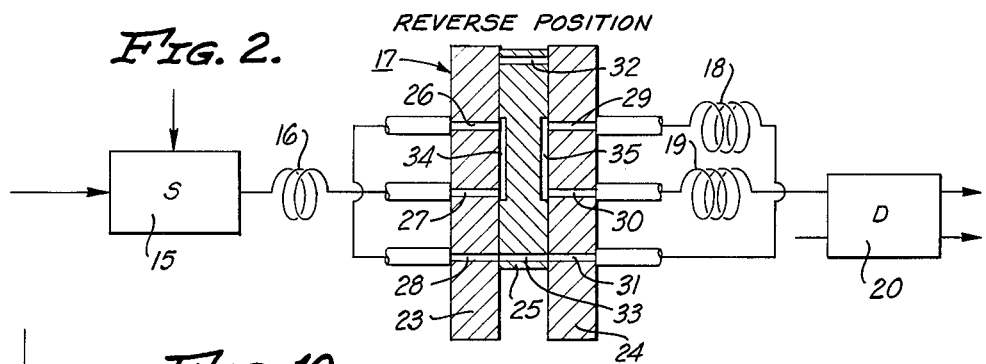
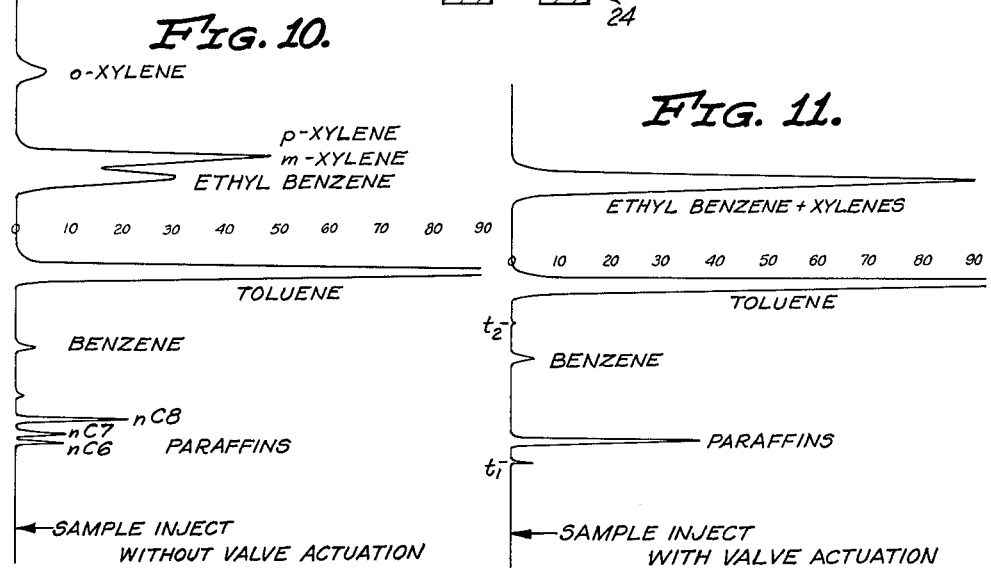
INVENTOR.
RICHARD VILLALOBOS
BY HIS ATTORNEYS
HARRIS, KIECH, RUSSELL & KERN

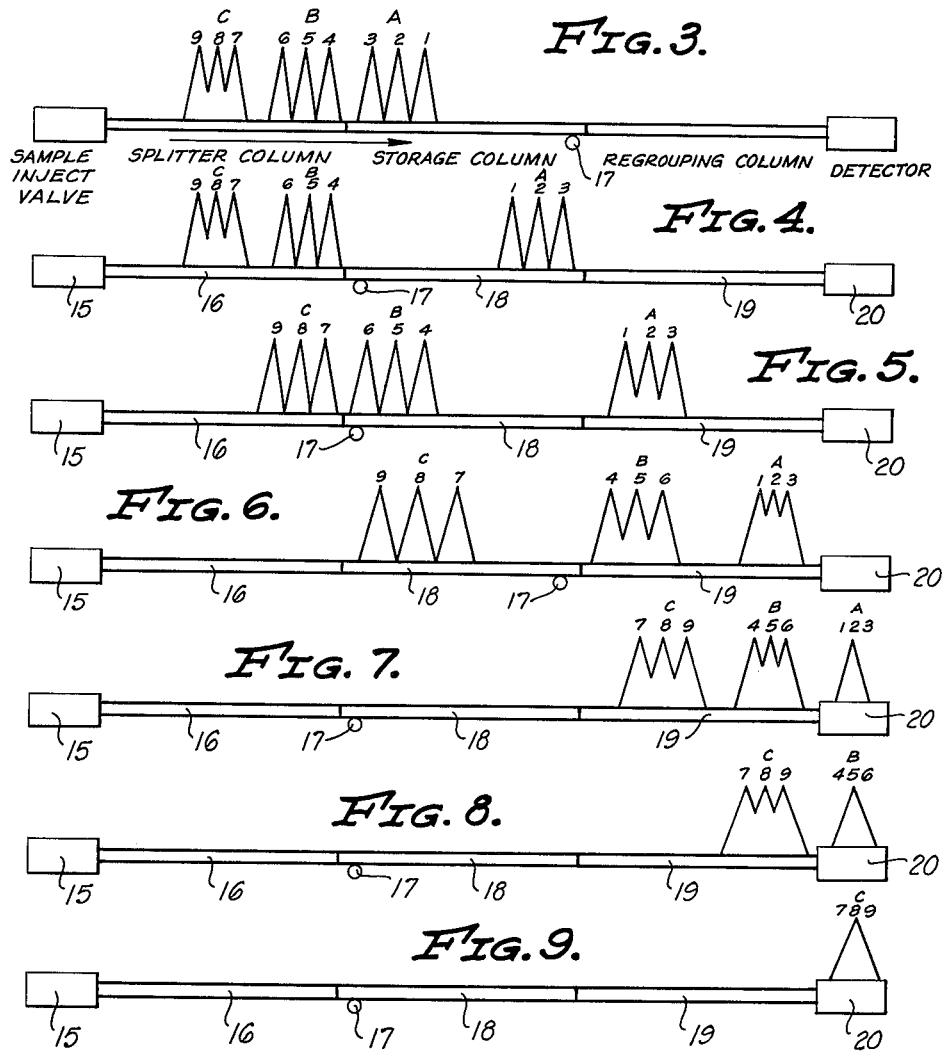

United States Patent Office 3,201,971
Patented Aug. 24, 1965

3,201,971
GAS CHROMATOGRAPH
Richard Villalobos, Santa Ana, Calif., assignor to Beckman Instruments, Inc., a corporation of California
Filed Oct. 8, 1962, Ser. No. 228,930
6 Claims. (Cl. 73—23.1)

This invention relates to gas chromatography and, in particular, to a new column configuration and method of analyzing samples. It is oftentimes desirable to determine how much of each of one or more classes of components are present in a sample. For example, it may be desired to analyze a sample containing paraffins, olefins, diolefins and acetylenes to determine the quantity of each carbon number class present rather than the quantity of each individual paraffin, olefin, diolefin and acetylene. One way of obtaining this result is to perform a conventional chromatographic analysis of the sample to obtain a figure for each individual component and then add all of the $C_1$ components to provide a figure for the $C_1$ class. Similar additions are then performed for each carbon number class of interest. The addition can be performed by the operator or can be performed by mechanical or electrical integrators.

In many instances, particularly in process control work, it is highly desirable to provide a chromatographic analyzer output with a single output reading for each class of components of interest without requiring any operator attention or additional integrating or totalizing equipment. Accordingly, it is an object of the present invention to provide a gas chromatograph for analyzing samples and producing output indications as a function of classes of components in the sample. A further object is to provide such an instrument for analyzing samples and producing output indications as a function of subclasses of components within classes of the sample.

The present invention contemplates the use of a group of chromatographic columns and a flow control valve with the flow pattern through the columns being changed during the analysis such that the components of the sample are split into classes of predetermined characteristics after which the components of a single class are recombined to form a single peak at the detector to provide an output indication representative of the total quantity of all the components of the class.

It is an object of the invention to provide a gas chromatograph including a splitter column, a storage column and a regrouping column, a gas flow control means, and conduit means for establishing gas flow from the sample injector through the splitter column, storage column and regrouping column to the detector, with flow through the storage column in a first direction during one period of operation and in the reverse direction during another period of operation.

It is a further object to provide such an instrument including a splitter column capable of separating the components of the sample into groups of predetermined characteristics, a storage column capable of retaining all of the components of a group at one time, and a regrouping column having substantially the same characteristic as the splitter column, with flow being established through the storage column in a first direction during elution of a group of components into the storage column, and with flow being established through the storage column in the reverse direction to backflush such group from the storage column into the regrouping column.

It is another object to provide such an instrument for analyzing a sample and grouping the components of the sample into classes and subclasses providing separated peaks for each subclass of a class and including a splitter column capable of separating the components of the sample into groups of predetermined class characteristics, a storage column capable of retaining all of the components of a group at one time, and a regrouping column capable of separating the components of a group into subgroups of predetermined subclass characteristics, with flow being established through the storage column in a first direction during elution into the storage column of a group of components representing a class, and with flow being established through the storage column in the reverse direction to backflush such group from the storage column into the regrouping column wherein the components of the group are separated into subgroups representing the subclasses.

It is a particular object of the invention to provide a method of analyzing a sample to obtain a quantitative measure of a class of components and including the steps of splitting the sample into classes of components in a first column, eluting an entire class of components from the first column to a second column, backflushing the eluted class from the second column to a third column which has substantially the same characteristic as the first column whereby the components of such class are regrouped into a single peak, and detecting such single peak on elution from the third column.

It is a further object of the invention to provide a method of analyzing a sample for a quantitative measure of a subclass of a class of components and including the steps of splitting the sample into classes of components in a first column, eluting an entire class of components from the first column to a second column, backflushing the eluted class from the second column to a third column, separating the class into subclasses in the third column, and detecting each of the subclasses on elution from the third column.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIGS. 1 and 2 diagrammatically illustrate the arrangement of the columns and other components of the gas chromatograph with the valve in the forward and reverse positions respectively;

FIGS. 3-9 illustrate the operation of the chromatograph of the invention in the analysis of a sample containing three classes with three components per class;

FIG. 10 is a chart showing the analysis of a sample by conventional chromatography; and FIG. 11 is a chart showing the analysis of the same sample by means of the present invention.

Referring to FIG. 1, the gas chromatograph illustrated includes a sample inject valve 15, a first or splitter column 16, a flow control valve 17, a second or storage column 18, a third or regrouping column 19, and a detector 20. Various conventional forms of sample injection means and detector means may be utilized. Various conventional flow control valves may be utilized, the valve illustrated herein incorporating fixed body members 23, 24 and a sliding valve member 25. The body member 23 includes passages 26, 27, 28 and the body member 24 includes passages 29, 30, 31. The valve member includes passages 32, 33, 34 and 35. The components are connected so that when the valve is in the forward position of FIG. 1, gas flow is established from the sample valve through the splitter column, through the storage column in a first or forward direction, and through the regrouping column to the detector. With the valve in the reverse position of FIG. 2, flow is established from the sample valve through the splitter column, through the storage column in the reverse direction, and through the regrouping column to the detector. With a thermal-conductivity-type detector as illustrated herein, a stream of pure carrier gas is also directed through the detector to serve as a reference. The valve 17 may be operated manually or by means of a timer or other automatic control device. The makeup of each column will be dependent upon the particular samples being analyzed as in conventional gas chromatographs. The splitter column 16 is designed to separate the components of the sample to a degree and to group the components into separate classes determined by some common characteristics. Specific examples will be given hereinbelow. The storage column is designed so as to retain at one time all of the components of a class. The regrouping column is designed to have substantially the same characteristic as the splitter column.

The operation of the chromatograph of the invention is illustrated in FIGS. 3-9. A sample consisting of nine components is to be analyzed for the total of each of three classes of components, A, B, and C. Components 1, 2 and 3 comprise class A, components 4, 5 and 6 comprise class B, and components 7, 8 and 9 comprise class C. As the sample passes through the splitter column 16, complete separation is achieved between classes A, B and C. Partial or complete separation may be achieved between the components of a class.

Class A components enter the storage column 18, as shown in FIG. 3. Before any of the class B components enter the storage column, the valve 17 is moved from the forward position to the reverse position, as shown in FIG. 4, reversing the flow of carrier gas through the storage column. The class A components are backflushed from the storage column into the regrouping column 19 (FIG. 5). The class A components are brought together as they pass through the regrouping column (FIG. 6) and enter the detector as a single peak (FIG. 7).

After the class A components are eluted from the storage column and all of the class B components have entered the storage column (FIG. 5), the valve 17 may be returned to the forward position. The class B components are now backflushed from the storage column into the regrouping column while the class C components enter the storage column (FIG. 6). The valve 17 is again actuated to backflush the class C components into the regrouping column (FIG. 7). The class B components are recombined in the regrouping column and enter the detector as a single peak (FIG. 8) and the same occurs with the class C components (FIG. 9).

With the instrument of the present invention, all of the components of a class elute simultaneously from the regrouping column into the detector and the resultant peak is symmetrical with the height of the peak being an accurate measure of the arithmetic sum of the individual components of the class. Hence no adding by the operator is required and the need for complex integrating or totalizing equipment is obviated. The desired result is achieved using a single valve which may be automatically operated in a time sequence.

The number of valve switching operations required during analysis of a sample is dependent upon the number of classes which are to be regrouped. The example shown in FIGS. 3-9 provides for regrouping of three classes. The instrument may be operated to regroup only a single class or any number of classes, there being no theoretical limit on the number of classes which can be regrouped. Conventional chromatographic analyses are obtained for the components of the classes that are not regrouped into single peaks.

As indicated above, it is desirable that the regrouping column have the same characteristic as the splitter column. Then the regrouping column counteracts the separation of components of a class produced by the splitter column, while maintaining the separation between classes. The desired column relationship is best achieved by making the columns identical as to tubing, packing and substrate. If the carrier gas was noncompressible, the two columns should also be identical in length. However, since the carrier is compressible and continually expands as it flows through the instrument, the retention volume of a component varies as a functon of the ratio of the inlet pressure to the outlet pressure for the particular column. The desired equivalent characteristic is achieved by making the regrouping column longer than the splitter column. It is possible to calculate the exact length of the columns from a knowledge of the pressure drop on the instrument and the relative retention times of the components. The column lengths can also be determined by trial and error and this is often the quicker method. The storage column need only be long enough to prevent the first component of a class from eluting into the regrouping column before the last component of the class enters the storage column and need not have the same characteristic or makeup as the other columns. Ordinarily, the storage column is made with the same tubing, packing and substrate as the splitter and regrouping columns and the length is determined by analysis of the output from the splitter column or by trial and error.

A specific example of the operation of a chromatograph incorporating the invention is shown in FIGS. 10 and 11. The instrument utilized was a Beckman Model 320-C Process Gas Chromatograph modified to incorporate the three columns and the valve of FIGS. 1 and 2. The splitter column was six feet, the storage column seven feet, and the regrouping column eight feet, all $3/16$ inch diameter tubing. The columns were packed with a substrate of seven percent Pentrile A (tetracyanoethoxy pentaerythritol) on 42–60 mesh crushed C–22 firebrick. The instrument was operated with helium carrier gas at 75 cc./min. at 38 p.s.i.g., 104° C.

When the instrument is operated as a conventional gas chromatograph with the valve 17 maintained in its forward position, the sample is separated into individual components, as shown in FIG. 10. FIG. 11 illustrates the output when the same sample is analyzed with the valve 17 being actuated to the reverse position at time $t_1$ and again actuated to the forward position at time $t_2$. In this analysis of toluene for impurities, the $C_6$–$C_8$ paraffins have been regrouped into a single symmetrical peak. Similarly, the $C_8$ aromatics have been regrouped into a single symmetrical peak.

The instrument of the invention may be used for various other analyses. For example, a straight-run naphtha sample may be analyzed by carbon number by actuating the reversing valve once for each carbon number thereby regrouping all components of a single carbon number into a single peak. Typically this type of analysis may be made using a substrate of ten percent silicone oil on 42–60 mesh C–22.

In another embodiment, the instrument of the invention may be used to provide a direct measure of the components of one or more subclasses of one or more classes of components in the sample. For example, the components of a hydrocarbon sample may first be classified by carbon number and then the components of each carbon number class may be classified by structure, i.e., paraffin, olefin, naphthene, and aromatic. The structure and mode of operation of the instrument will be the same as described above. However, the characteristics of the columns themselves will be different and of course will be dependent upon the particular sample and classification systems utilized.

The splitter column will be designed to separate the components of the sample into groups as determined by the characteristics of the classes. The flow control valve will be actuated after elution of each group from the splitter column in order to separately backflush each group of interest into the regrouping column. The components comprising the various subclasses in the class may appear in the group in the order of subclassification or may be interspersed. The regrouping column is designed to separate the components of the group into subgroups based on the subclass characteristics. Each subgroup of components is then eluted from the regrouping column as a separate peak or series of peaks isolated from the components comprising the other subclasses. It is sometimes difficult to construct a regrouping column which will combine all of the components of each subgroup into a single symmetrical peak for each subgroup. However, the column can ordinarily be designed to provide a single symmetrical peak for at least one subclass of interest and always will provide clear separation between each subclass at the output of the regrouping column.

A specific example of this type of analysis is the analysis of a catalytic reformer feed stock for specific paraffin, naphthene and aromatic components. The range may be several carbon numbers, probably $C_6$ to $C_{10}$ and it is desired to determine these components for each carbon number.

Here the sample is being classified into carbon number classes and structural subclasses. The splitter column separates the components into groups, all components of a group having the same carbon number. When a complete group has entered the storage column, the flow control valve is actuated to separate this group from the preceding and following groups and backflush the group into the regrouping column. The composition of the regrouping column will be such that it tends to pass paraffins very rapidly, naphthenes less rapidly and aromatics slowly. Then the paraffins of the group will be recombined and eluted together as a subclasses, followed by the naphthenes as a separate subclass and finally by the aromatics as a separate subclass. In the particular example described above, the regrouping column was designed to recombine the aromatics into a single symmetrical peak while the paraffins and naphthenes produced irregular peaks. The analysis may be run on a Beckman Model 320-C Process Gas Chromatograph with a splitter column 8.5 feet, a storage column 7.7 feet and a regrouping column 13.5 feet, all 3/16 inch diameter tubing. The splitter and storage columns may be packed with a substrate of General Electric SF96 silicone oil on 42-60 mesh C-22 and the regrouping column with 11% tricresylphosphate on 42-60 mesh C-22.

The chromatograph of the invention permits measurement of the components of a class as a single peak with the height of the peak being representative of the sum of the components. This provides a direct analyzer output by class or group with the output being directly available for control or other use without requiring additional manipulation or attention from the operator.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a gas chromatograph having sample injection means, detector means and means for directing a stream of carrier gas therethrough, the combination of:
   a splitter column;
   a storage column;
   a regrouping column;
   gas flow control valve means movable between forward and reverse positions; and
   conduit means interconnecting said columns, valve means, sample injection means, and detector means for gas flow from said sample injection means through said splitter column, storage column and regrouping column to said detector means, said valve means being connected through said conduit means to opposite ends of said storage column so that flow through said storage column is in a first direction when said valve means is in said forward position, and so that flow through said storage column is in the reverse direction when said valve means is in said reverse position.

2. In a gas chromatograph for analyzing a sample and grouping the components of the sample into classes with each class providing a single output peak at the detector, the chromatograph including sample injection means, detector means and means for directing a stream of carrier gas therethrough, the combination of:
   a splitter column capable of separating the components of the sample into groups of predetermined characteristics, with the components of a group being at least partially separated;
   a storage column capable of retaining all of the components of a group at one time;
   a regrouping column having substantially the same characteristic as said splitter column;
   gas flow control valve means movable between forward and reverse positions; and
   conduit means interconnecting said columns, valve means, sample injection means and detector means for gas flow from said sample injection means through said splitter column, storage column and regrouping column to said detector means, said valve means being connected through said conduit means to opposite ends of said storage column so that flow through said storage column is in a first direction when said valve means is in said forward position whereby a group of at least partially separated components is eluted into said storage column in the forward direction, and so that flow through said storage column is in the reverse direction when said valve means is in said reverse position whereby said group is back-flushed from said storage column and combined into a single peak in said regrouping column.

3. In a gas chromatograph for analyzing a sample and grouping the components of the sample into classes and subclasses providing at the detector separated peaks for each subclass of a class, the chromatograph including sample injection means, detector means and means for directing a stream of carrier gas therethrough, the combination of:
   a splitter column capable of separating the components of the sample into groups of predetermined class characteristics;
   a storage column capable of retaining all of the components of a group at one time;
   a regrouping column capable of separating the components of a group into subgroups of predetermined subclass characteristics;
   gas flow control valve means movable between forward and reverse positions; and
   conduit means interconnecting said columns, valve means, sample injection means and detector means for gas flow from said sample injection means through said splitter column, storage column and regrouping column to said detector means, said valve means being connected through said conduit means to opposite ends of said storage column so that flow through said storage column in a first direction when said valve means is in said forward position whereby a group of components is eluted into said storage column in the forward direction, and so that flow through said storage column is in the reverse direction when said valve means is in said reverse position whereby said group is backflushed from said storage column into said regrouping column for separation into subgroups and elution from said regrouping column.

4. In a gas chromatograph, the combination of:
   a sample injector;
   a detector;
   a splitter column, a storage column and a regrouping column;

a flow control valve movable between forward and reverse positions; and means interconnecting said columns, valve, injector and detector, said means interconnecting said control valve with opposite ends of said storage column and with the outlet end of said splitter column and with the inlet end of said regrouping column so that gas flows from said injector through said splitter column, storage column and regrouping column to said detector, with flow through said storage column in a first direction with said valve in the forward position and in the reverse direction with said valve in said reverse position.

5. A method of analyzing a sample for a quantitative measure of a subclass of a class of components, including the steps of:

splitting the sample into classes of components in a first chromatographic column;

eluting an entire class of components from said first column to a second chromatographic column;

backflushing said eluted class from said second column to a third chromatographic column;

separating said class into subclasses in said third column; and detecting each of said subclasses on elution from said third column.

6. A method of analyzing a hydrocarbon sample for a quantitative measure of a structural subclass of a carbon number class of components, including the steps of:

separating the sample in a first chromatographic column into classes of components according to carbon number;

eluting an entire carbon number class of components from said first column to a second chromatographic column;

backflushing said eluted class from said second column to a third chromatographic column;

separating said carbon number class in said third column into structural subclasses with all of the components of a subclass in a group; and detecting said group on elution from said third column.

References Cited by the Examiner

UNITED STATES PATENTS 2,846,121   8/61   Ronnebeck.

OTHER REFERENCES

Baker et al.: Control Engineering, vol. 8, No. 1, January 1961, pages 77–81.

Villalobos et al.: Gas Chromatography, edited by Noebels et al., Academic Press, New York, 1961.

RICHARD C. QUEISSER, *Primary Examiner.*

JOSEPH P. STRIZAK, *Examiner.*